United States Patent Office 3,424,779
Patented Jan. 28, 1969

3,424,779
CYCLOPOLYSILOXANES SUBSTITUTED WITH
TRIALKYLSILYLPHENYL GROUPS
Tse C. Wu, 9 Clemente Lane,
Waterford, N.Y. 12188
No Drawing. Filed Nov. 21, 1966, Ser. No. 595,631
U.S. Cl. 260—448.2       6 Claims
Int. Cl. C07f 7/18; C08g 31/22

This application relates to organopolysiloxanes having at least one trialkylsilylphenyl substituent. More particularly, this application relates to hexaorganocyclotrisiloxanes having the formula:

(1) 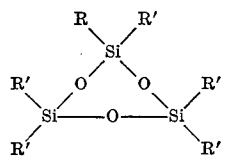

where R is a trialkylsilphenyl substituent having a formula selected from the class consisting of:

(2) 

(3) 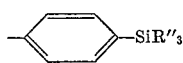

and (4) 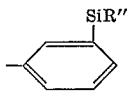

where Me is methyl, R″ is a lower alkyl radical selected from the class consisting of methyl (Me), ethyl (Et), and propyl (Pr), no more than two R″ substituents being methyl on any single trialkylsilylphenyl substituent; and R′ is selected from the class consisting of monovalent aryl substituents and trialkylsilylphenyl substituents as defined for R. Included among the monovalent aryl radicals are phenyl (Ph) and tolyl (T).

Aryl-substituted organopolysiloxanes are known to have greater high temperature stability and radiation resistance than the corresponding alkyl-subsituted organopolysiloxanes. However, phenyl-substituted organopolysiloxanes, while having the high temperature and radiation resistance properties ascribed to aryl-substituted organopolysiloxanes, are generally brittle. Chiefly, this brittleness is believed due to the symmetry of the phenyl substitution. If the symmetry is broken by the inclusion of other substituents, the compounds become more flexible. However, if this other substituent is alkyl, then the full effect of the high temperature and radiation resistance properties of the phenyl-substituted compound is not realized. If the symmetry is broken by the inclusion of another aryl substituent, not only is the compound less brittle, but, additionally, the high temperature and radiation resistance properties can be fully realized.

Cyclic organopolysiloxanes have been found particularly valuable in the formation of organopolysiloxanes, especially high molecular weight polymers. Exemplary of these long-chain polymer raw materials which have proven invaluable are octamethylcyclotetrasiloxane, and hexaphenylcyclotrisiloxane. The cyclic polysiloxanes to be used for forming the long-chain polymers must be extremely pure. It is, therefore, an object of this invention to provide cyclic polysiloxanes, of sufficient purity for use in forming high molecular weight polymers, the cyclic polysiloxanes being substituted with trialkylsilylphenyl substituents, as described in Formula 1.

Two methods are available for forming hexaorganocyclotrisiloxanes substituted with trialkylsilylpenyl substituents. The first, involving treatment of diorganodichlorosilane with dimethylsulfoxide, is useful when it is desired to produce a symmetrical cyclic polysiloxane, that is, one having the same number and type of trialkylsilylphenyl substituents on each of the silicon atoms in the cyclic polymer. The second method, while also useful in forming symmetrical hexaorganocyclotrisiloxanes, can be employed to form mixed or unsymmetrical cyclic polymers, that is, those containing different numbers or different types of trialkylsilylpenyl substituents on the various silicon atoms within the cyclic trisiloxane.

The first reaction, involving dimethylsulfoxide, is represented by the following skeletal equation:

(5) 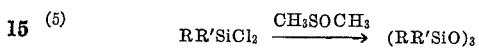

where R and R′ are as previously defined. The by-products of the reaction are very complex and, often, indeterminate. They have, therefore, not been included in the reaction equation shown above and, additionally, because the exact nature of the by-products is not essential to an understanding of the reaction.

The condensation reaction involves a diorganodichlorosilane with a tetraorganodisiloxanediol or a diorganosilanediol with a dichlorotetraorganodisiloxane. These reactions are represented by the following equations:

(6) 

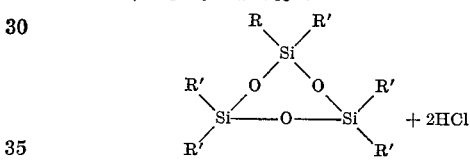

(7) 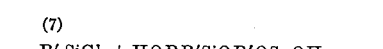

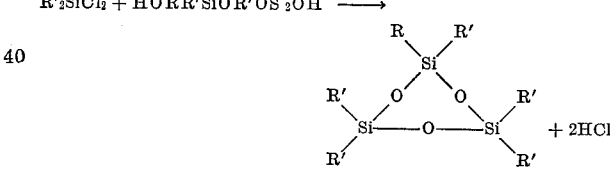

(8) 

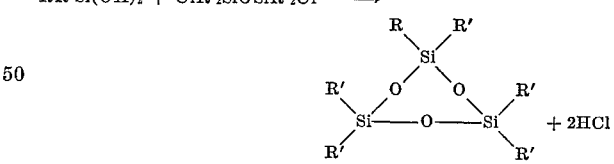

(9) 

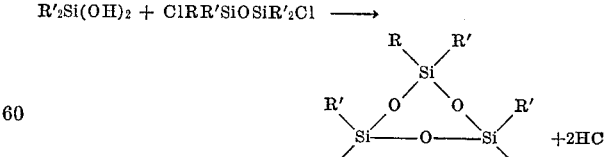

where R and R′ are as previously defined. Each of these reactions is run in solution in the presence of an acid acceptor to remove the generated acid so as to preclude polymerization of the cyclic trisiloxane during formation. It can be seen from the equations above that either the monomeric silane or the dimeric disiloxane can be substituted with the trialkylsilylphenyl substituent, regardless of which compound carries the chlorine substituents and which the hydroxyl substituents.

With respect to the cyclic formation employing dimethylsulfoxide, as shown in Equation 5, the reaction is preferably conducted in an aromatic hydrocarbon solvent, such as toluene. Preferably, the dimethylsulfoxide is dissolved in a portion of the solvent and placed in the reaction vessel, while the diorganodichlorosilane substituted with the trialkylsilylphenyl substituent is dissolved in an additional portion of the solvent and placed in a separate vessel for addition to the reaction vessel. The total amount of solvent should be such that there are about 0.5 to 3 moles of the diorganodichlorosilane for each liter of the solvent. The amount of dimethylsulfoxide should be such that there are from about 1.5 to 3 moles for each mole of the diorganodichlorosilane, and preferably about 2 moles of the dimethylsulfoxide for each mole of the silane. The reaction is preferably conducted at a temperature of about 50–70° C. and the addition of the silane to the dimethylsulfoxide solvent solution should be at such a rate as to keep the temperature at about the preferred level. Generally, the addition of the silane should consume from about 15 minutes to 1 hour. The reaction mixture is then stirred for a short time to assure completion of the reaction. Following reaction the reaction mixture is distilled, generally under slight vacuum, to remove the solvent and other volatiles, and the resulting residue, consisting primarily of the desired cyclic trisiloxane, is flash distilled and the distillate recrystallized from a solvent such as acetonitrile, ethyl acetate, or hexane.

The condensation reactions, as shown in Equations 6, 7, 8, and 9 are also conducted in the presence of an aromatic solvent, such as toluene or benzene. Here, the total concentration of the diorganosilanediol and dichlorotetraorganodisiloxane or the diorganodichlorsilane and tetraorganodisiloxanediol should be in the range of 0.01 to 0.1 mole per liter of solvent. This dilute solution favors the formation of cyclics over various straight chain polymers. While the dichloro- and dihydroxy compounds are preferably reacted in the stoichiometric ratio of 1:1 there can be up to a 10 percent molar excess of either of the reactants present.

Preferably, the reaction is conducted by placing a portion of the desired solvent into a reaction vessel along with the necessary acid acceptor. The acid acceptor absorbs generated hydrogen chloride in a molar ratio of 1:1. Thus, there must be at least one mole of acid acceptor used for each mole of hydrogen chloride produced. Preferably, the acid acceptor is present in an amount at least 50 percent in excess of the stoichiometric requirement and can be present in an excess of several hundred percent. Among the acid acceptors which can be utilized are the tertiary amines, including pyridine, picoline, 1,4-diazobicyclo(2,2,2)octane and the dialkyl anilines.

To the solvent containing the acid acceptor, the two reactants are added simultaneously, each being contained in a solvent medium. Preferably, the solvent solutions of the reactants are added at equal volumetric rates and at equal molar rates to the solvent-acid acceptor solution. The reaction can be conducted at any temperature from about 10° C. to the boiling point of the reaction mixture. Preferably, however, the reaction is conducted at room temperature, both for convenience and because the reaction is accomplished very rapidly, even at room temperature.

The reactants should be added over a period of from about 30 minutes to 2 hours, to aid in assuring the formation of cyclics. The relatively slow addition rate prevents the concentration of reactants from rising beyond a desirable level and thus maintains the dilute solution which promotes the formation of cyclics. Preferably, the reaction mixture is stirred for at least 1 hour following the addition, to assure completion of the reaction.

Following completion of the reaction, the reaction mixture is filtered to remove the acid acceptor-hydrogen chloride salts. The solvent is then evaporated and the resultant compound is further purified by recrystallization from solvents such as petroleum ether, acetonitrile, ethyl acetate, and hexane. In some cases the compound may be partially purified in a vacuum distillation prior to recrystallization.

The formation of the cyclotrisiloxanes of the present invention will now be described in greater detail in the following examples. These examples should be considered as illustrative only, and not as limiting in any way the full scope of the invention as covered in the appended claims. All parts in these examples are by weight.

PRODUCTION OF CYCLOTRISILOXANES SUBSTITUTED WITH TRIALKYLSILYLPHENYL SUBSTITUENTS EMPLOYING DIMETHYLSULFOXIDE

Example 1

In a reaction vessel equipped with a stirrer, thermometer, gas outlet tube, and addition vessel, there was placed 7.8 parts of dimethylsulfoxide dissolved in 65 parts of dry toluene. The solution was heated to 65° C. and to it was added a second solution containing 20 parts of dichlorobis(m-trimethylsilylphenyl)silane dissolved in 35 parts of dry toluene. The addition was carried out at such a rate as to maintain the temperature of the reaction mixture at about 65° C., and consumed approximately 20 minutes. Stirring was continued following completion of the addition and the reaction mixture was allowed to cool to room temperature. Heat was then applied and the reaction mixture was distilled until the head temperature reached 120° C. The volatile materials were removed with the aid of an aspirator. The residue was then flash distilled and gave a product boiling at 262–276° C., at 0.02 mm. This product was washed with methanol, filtered, and dried yielding 9.3 parts, 54 percent of the theoretical cyclotrisiloxane based on the input diorganodichlorosilane, of solids melting at 135–157° C. The solids were recrystallized twice from acetonitrile to yield a product, with a melting point of 158–159° C., having the formula:

(10)
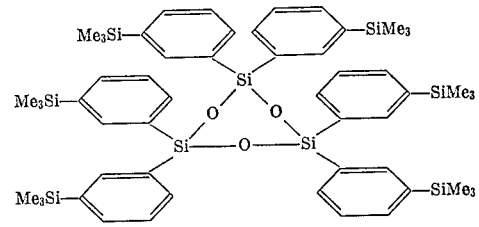

which is equivalent to the product of Formula 1 where R and each R' is as shown in Formula 2 with the trimethylsilyl group in the meta position. Further recrystallizations of this product from acetonitrile or ethanol did not result in a change in the melting point. The structure of the product was substantiated by an infrared spectrum.

The product was found to be soluble in a number of solvents, including pentane, ethyl acetate, and cyclohexane.

Example 2

Using a procedure similar to that described for Example 1, a quantity of 39.7 parts of bis(p-trimethylsilylphenyl)dichlorosilane was treated with 15.6 parts of dimethylsulfoxide. A quantity of 19.7 parts of a crude product, was obtained at a boiling point of 270–310° C. at 0.02 mm. in the vacuum distillation. This crude product, with a melting point of 104–135° C., was the equivalent of a 58 percent yield, based on the theoretical, of the desired cyclotrisiloxane. The crude product was recrystallized four times from acetonitrile to give 9.5 parts, a 28 percent yield based on the theoretical, of crystals having the formula:

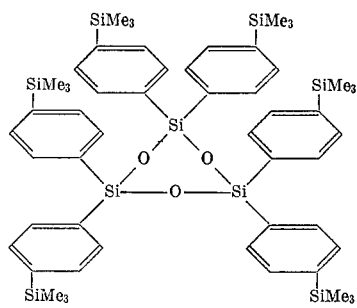

(11)

which is equivalent to the product of Formula 1 with R and each R' as shown in Formula 2 having the trimethylsilyl group in the para position. This product had a melting point of 191–193° C. and its structure was substantiated by an infrared spectrum.

Example 3

Employing the same procedure as used in Example 1, 36.7 parts of phenyl(m-triethylsilylphenyl)dichlorosilane is treated with 17 parts of dimethylsulfoxide. The material is purified as described in Example 1 and results in a product having the structure:

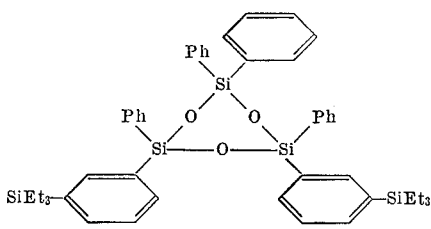

(12)

which is equivalent to the structure shown in Formula 1 where R and one R' on each of the other two silicon atoms is as shown in Formula 4 where each R'' is ethyl, and each of the other R' substituents is phenyl.

PRODUCTION OF CYCLOTRISILOXANES SUBSTITUTED WITH TRIALKYLSILYLPHENYL SUBSTITUENTS EMPLOYING A CONDENSATION REACTION

Example 4

In this example the production of 2,2-diphenyl-4,4,6,6-tetrakis(m-trimethylsilylphenyl)cyclotrisiloxane is illustrated. A quantity of 350 parts of dry benzene is placed in a reaction vessel fitted with a stirrer, two vessels for the addition of reactants, and a drying tube. Into one of the addition vessels is placed a solution containing 8.7 parts of diphenylsilanediol, 10 parts of pyridine, and 175 parts of benzene. A solution of equal volume containing 33.2 parts of 1,3-dibromo-1,1,3,3-tetrakis(m-trimethylsilylphenyl) disiloxane in benzene was placed in the other addition vessel. Simultaneously, the two solutions were added to the reaction vessel at the same rate over a period of about 30 minutes, with vigorous stirring and without external heat influences. The resulting reaction mixture was stirred for an additional 2 hours after completion of the addition. A water-soluble salt formed and was removed by filtration. The filtrate was placed in a flash evaporator to remove the solvent and the residue was extracted with petroleum ether and refiltered. The solvent was evaporated from the filtrate of the second filtration and the residue was recrystallized from acetonitrile resulting in 29.3 parts, an 83 percent yield based on the theoretical, of a material having the structure:

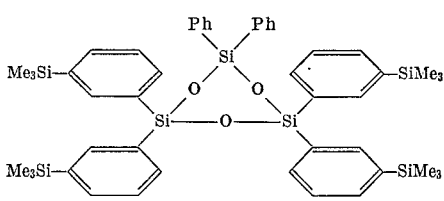

(13)

which is equivalent to the material of Formula 1 where R, the R' attached to the same silicon atom, and two R' substituents on a second silicon atom are as shown in Formula 2 with the trimethylsilyl group in the meta position, and the other two R' substituents are phenyl. This material had a melting point of 69–73° C. The product was recrystallized three times from ethyl alcohol containing a small percentage of benzene to yield 14.8 parts, a 42 percent yield based on the theoretical, of crystal melting at 96–97° C. The structure of these crystals as that of Formula 13 was substantiated by an infrared spectrum.

Example 5

This example illustrates the preparation of 2,2-bis(m-trimethylsilylphenyl)tetraphenylcyclotrisiloxane. A quantity of 60 parts of pyridine was dissolved in 880 parts of benzene and this solution was placed in a reaction vessel equipped with a stirrer, two vessels for the addition of other reactants, and a drying tube. Two additional solutions were prepared, one containing 99.4 parts of bis(m-trimethylsilylphenyl)dichlorosilane in about 700 parts of benzene, and the second, of equal volume with the first, containing 103.7 parts of sym-tetraphenyldisiloxanediol in benzene. These solutions were placed, respectively, in the two vessels for the addition of reactants and were added, simultaneously, at the same rate to the benzene-pyridine solution over a period of 1¾ hours, with stirring. The reaction mixture was stirred, at room temperature, for about 4 hours and it was then filtered to remove the solids which formed. The filtrate was evaporated and the residue washed with methanol and filtered to yield 164.5 parts of solids with a melting point of 95–108° C. This solid residue was subjected to a vacuum distillation and yielded 155 parts of product boiling at 281–304° C. at 0.02 mm., with a melting point of 102–109° C. This product was recrystallized three times from acetonitrile yielding 110.3 parts, a 60 percent yield based on the theoretical, of crystals having the structure:

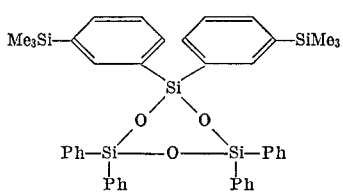

(14)

which corresponds to the material of Formula 1 where R and the R' substituent on the same silicon atom are as shown in Formula 2 with the trimethylsilyl group in the meta position, and each of the other R' substituents is phenyl. This material had a melting point of 109.5–110.5° C. and its structure was substantiated by an infrared spectrum.

Example 6

This example illustrates the preparation of 2,2-bis(p-trimethylsilylphenyl)tetraphenylcyclotrisiloxane. Employing a procedure similar to that used in Example 5, 48.4 parts of bis(p-trimethylsilylphenyl)dichlorosilane and 50.6 parts of sym-tetraphenyldisiloxanediol were reacted in the presence of 28 parts of pyridine contained in 1225 parts of benzene. The reaction mixture was treated as in the previous example and yielded 75.6 parts of crude solids melting at 130–142° C. These solids were subjected to a vacuum distillation and yielded 65.6 parts of product boiling at 276–293° C. at 0.02 mm. The material obtained from the vacuum distillation was recrystallized three times from hexane to yield 47.5 parts, 53 percent based on the theoretical, of a material having the structure:

(15)

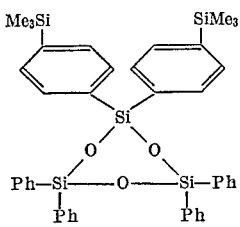

which is the material of Formula 1 where R and the R' substituent attached to the same silicon atom are as shown in Formula 2 with the trimethylsilyl group in the para position, and each of the other R' substituents is phenyl. The material had a melting point of 143.5–144.5° C. and its structure was substantiated by an infrared spectrum.

Examples 7–9

Employing essentially the same reaction conditions as used in Example 4, the following condensations are carried out, employing the silane and disiloxane as indicated to produce the designated hexaorganocyclotrisiloxane:

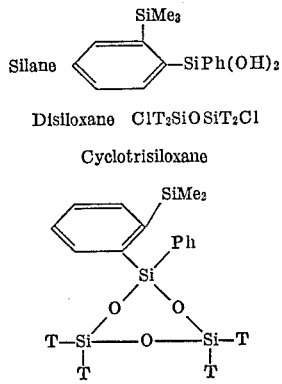

Example 8

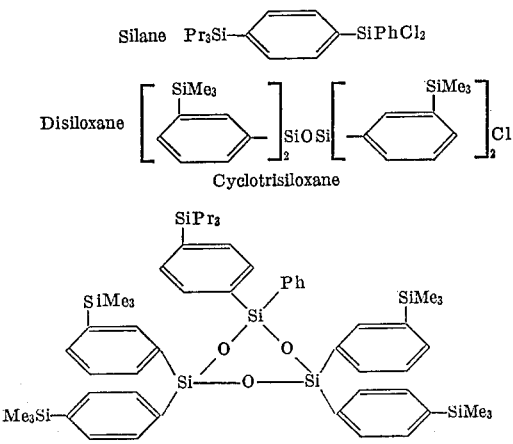

Example 9

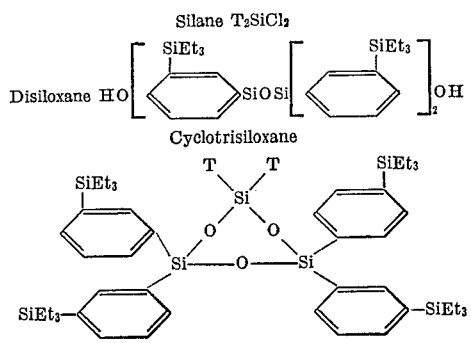

where T is the tolyl radical.. The product of Formula 16 is equivalent to that of Formula 1 where the trialkylphenyl substituent is as shown in Formula 2 with the trimethylsilyl group in the ortho position, the R' substituent on the corresponding silicon atom is phenyl and the remaining R'substituents are tolyl; the material of Formula 17 is equivalent to that of Formula 1 with R as indicated in Formula 3 where R'' is propyl, the R' substituent on the corresponding silicon atom is phenyl, and the remaining R' substituents are as shown in Formula 2 with the trimethylsilyl group in the meta position; the cyclotriseiloxane of Formula 18 is as shown in Formula 1 with R as shown in Formula 4 where R'' is ethyl, the R' substituent on the corresponding silicon atom and two additional R' substituents are the same as R, and the remaining R' substituents are tolyl.

Thus, a wide variety of hexorganocyclotrisiloxanes substituted with various trialkylsilylphenyl substituents have been shown. These cyclic materials are extremely valuable for forming high molecular weight polysiloxanes having trialkylsilylphenyl substituents. The polysiloxanes so formed, as described and claimed in my copending application Ser. No. 595,632, now U.S. Patent 3,385,821, filed of even date herewith and assigned to the same assignee as the present invention, have been found to have extremely high thermal stability, essentially equivalent to that of polytetrafluoroethylene, in contradistinction to other organopolysiloxanes.

What I claim as new and desire to secure by Letters Patent of the United States is:

1. A cyclotrisiloxane having the formula:

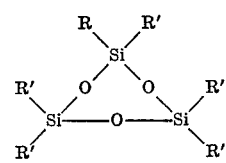

where R is a trialkylsilylphenyl substituent having a formula selected from the class consisting of:

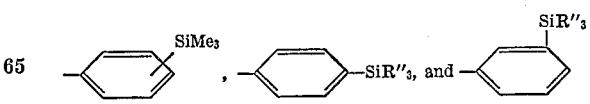

where Me is methyl, R'' is a lower alkyl radical selected from the class consisting of methyl, ethyl, and propyl, no more than two of said R'' substituents being methyl on any given trialkylsilylphenyl substituent; and R' is selected from the class consisting of monovalent aryl substituents and trialkylsilylphenyl substituents as defined for R.

2. The cyclotrisiloxane of claim 1 having the formula:

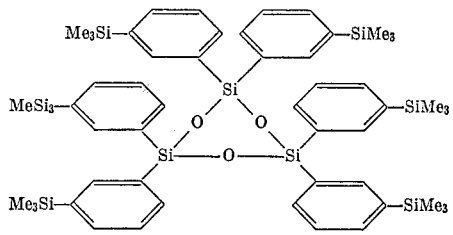

where Me is methyl.

3. The cyclotrisiloxane of claim 1 having the formula:

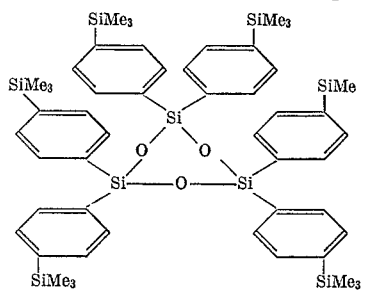

where Me is methyl.

4. The cyclotrisiloxane of claim 1 having the formula:

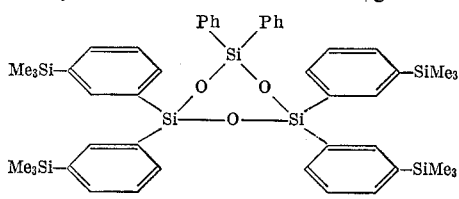

where Me is methyl and Ph is phenyl.

5. The cyclotrisiloxane of claim 1 having the formula:

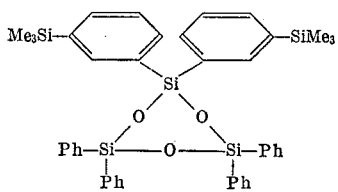

where Me is methyl and Ph is phenyl.

6. The cyclotrisiloxane of claim 1 having the formula:

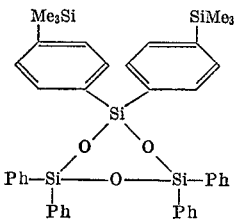

where Me is methyl and Ph is phenyl.

References Cited

UNITED STATES PATENTS

| | | | |
|---|---|---|---|
| 2,557,782 | 6/1951 | Clark | 260—448.2 |
| 2,628,242 | 2/1953 | Clark | 260—448.2 |
| 2,739,638 | 3/1956 | Lewis et al. | 260—448.2 X |
| 3,053,872 | 9/1962 | Omietanski | 260—448.2 |
| 3,385,821 | 5/1968 | Wu | 260—448.2 X |

HELEN M. McCARTHY, *Primary Examiner.*

PAUL F. SHAVER, *Assistant Examiner.*

U.S. Cl. X.R.

260—46.5

UNITED STATES PATENT OFFICE
CERTIFICATE OF CORRECTION

Patent No. 3,424,779                                                         January 28, 1969

Tse C. Wu

It is certified that error appears in the above identified patent and that said Letters Patent are hereby corrected as shown below:

In the heading to the printed specification, lines 4 and 5, "Tse C. Wu, 9 Clemente Lane, Waterford, N. Y. 12188" should read -- Tse C. Wu, Waterford, N. Y., assignor to General Electric Company, a corporation of New York --.

Signed and sealed this 24th day of March 1970.

(SEAL)
Attest:

Edward M. Fletcher, Jr.                         WILLIAM E. SCHUYLER, JR.
Attesting Officer                                    Commissioner of Patents